(12) United States Patent
Eichman et al.

(10) Patent No.: US 7,932,313 B2
(45) Date of Patent: *Apr. 26, 2011

(54) AQUEOUS COMPOSITIONS WITH POLYVALENT METAL IONS AND DISPERSED POLYMERS

(75) Inventors: Henry Jude Eichman, Havertown, PA (US); Alan Wayne Kohr, Schwenksville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 762 days.

This patent is subject to a terminal disclaimer.

(21) Appl. No.: 11/156,806

(22) Filed: Jun. 20, 2005

(65) Prior Publication Data

US 2005/0288411 A1    Dec. 29, 2005

Related U.S. Application Data

(60) Provisional application No. 60/582,697, filed on Jun. 24, 2004.

(51) Int. Cl.
*C08K 3/10* (2006.01)
(52) U.S. Cl. .................................. 524/434; 524/556
(58) Field of Classification Search .............. 524/434, 524/556
See application file for complete search history.

(56) References Cited

U.S. PATENT DOCUMENTS

| | | | |
|---|---|---|---|
| 3,467,610 A * | 9/1969 | Fiarman et al. ............... 524/77 |
| 4,006,020 A | 2/1977 | Polastri | |
| 4,150,005 A | 4/1979 | Gehman | |
| 4,455,402 A | 6/1984 | Amick | |
| 4,460,734 A | 7/1984 | Owens et al. | |
| 4,517,330 A | 5/1985 | Zdanowski | |
| 5,149,745 A | 9/1992 | Owens | |
| 6,020,413 A | 2/2000 | Wolff | |
| 6,043,314 A | 3/2000 | Owens | |
| 6,228,913 B1 | 5/2001 | Owens | |
| 6,290,866 B1 | 9/2001 | Lesko | |
| 6,548,596 B1 * | 4/2003 | Kohr et al. ............... 524/800 |
| 6,555,615 B2 | 4/2003 | Van Rheenen | |
| 6,613,832 B2 | 9/2003 | Friel | |
| 6,664,329 B2 | 12/2003 | Gwin | |
| 2004/0097644 A1 * | 5/2004 | Katou et al. ............... 524/800 |
| 2008/0114114 A1 * | 5/2008 | Eichman et al. ............... 524/430 |

FOREIGN PATENT DOCUMENTS

JP  05-263046  10/1993
JP  05263046 A  * 10/1993

OTHER PUBLICATIONS

T.G. Fox, "Influence of Diluent and Copolymer Compostion on the Glass Temperture of a Polymer System," Bull. Of the A.P.S., series II, vol. 1, p. 123, 1956.

* cited by examiner

*Primary Examiner* — Satya B Sastri
(74) *Attorney, Agent, or Firm* — Carl P. Hemenway

(57) ABSTRACT

There is provided a composition comprising
(a) at least one aqueous polymer dispersion, wherein said polymer is formed from a monomer mix comprising one or more carboxylic acid functional monomers;
(b) at least one swelling agent; and
(c) at least one polyvalent metal ion;
wherein said composition is formed by a process comprising the step of forming a preliminary admixture of said dispersion (a) with some or all of said swelling agent (b), wherein the ratio of equivalents of polyvalent metal ions in said preliminary admixture to equivalents of carboxylic acid functional groups in said preliminary admixture is 0.25 or less.

6 Claims, No Drawings

AQUEOUS COMPOSITIONS WITH POLYVALENT METAL IONS AND DISPERSED POLYMERS

This application claims the benefit of U.S. Provisional Application No. 60/582,697, filed Jun. 24, 2004.

BACKGROUND

A variety of useful compositions contain at least one polymer dispersed in water and at least one polyvalent metal cation. In some of such compositions, the polymer has acid functionality. Such compositions are useful for a variety of purposes, for example as ingredients in leather treatments and floor polishes. In the past, many known examples of such compositions had relatively low level of polyvalent cation, though, in some cases, the usefulness of such a composition is improved if the composition has a higher level of polyvalent metal cation. Higher levels of polyvalent cation are considered to improve the properties of such compositions; for example, coatings such as, for example, floor polishes, are thought to be more durable if higher levels of polyvalent metal cation are used. One method of increasing the level of polyvalent metal cation in such compositions is disclosed in U.S. Pat. No. 5,149,745, which teaches reacting an acid-functional polymer with a transition metal compound at a temperature above the glass transition temperature (Tg) of the polymer. It is desired to provide compositions with relatively high levels of polyvalent metal cation that can be made by alternative methods.

STATEMENT OF THE INVENTION

In a first aspect of the present invention, there is provided a composition comprising
(a) at least one aqueous polymer dispersion, wherein said polymer is formed from a monomer mix comprising 5-50% by weight based on the weight of said monomer mix, of one or more carboxylic acid functional monomers;
(b) 1 to 10 parts by weight of at least one swelling agent, based on 100 parts by weight of said monomer mix; and
(c) at least one polyvalent metal ion;
wherein the ratio of equivalents of polyvalent metal ions in said composition to equivalents of carboxylic acid functional groups in said composition is 0.4 or more; and wherein said composition is formed by a process comprising the step of forming a preliminary admixture of said dispersion (a) with some or all of said swelling agent (b), wherein the ratio of equivalents of polyvalent metal ions in said preliminary admixture to equivalents of carboxylic acid functional groups in said preliminary admixture is 0.25 or less.

In a second aspect of the present invention, there is provided a process of forming a composition, comprising the steps of
(a) forming at least one aqueous polymer dispersion, by a process comprising polymerization of a monomer mix comprising 5-50% by weight based on the weight of said monomer mix, of one or more carboxylic acid functional monomers;
(b) forming a preliminary admixture by admixing said dispersion (a) with 1 to 10 parts by weight of at least one swelling agent, based on 100 parts by weight of said monomer mix, wherein the ratio of equivalents of polyvalent metal ions in said preliminary admixture to equivalents of carboxylic acid functional groups in said preliminary admixture is 0.25 or less; and
(c) forming a subsequent admixture by admixing said preliminary admixture (b) with at least one polyvalent metal ion, wherein the ratio of equivalents of polyvalent metal ions in said subsequent admixture to equivalents of carboxylic acid functional groups in said subsequent admixture is 0.4 or more.

DETAILED DESCRIPTION

As used herein "(meth)acrylate" and "(meth)acrylic" mean, respectively, "acrylate or methacrylate" and "acrylic or methacrylic."

As used herein, a material is "aqueous" if that material contains at least 25% water by weight, based on the total weight of that material.

As used herein, a "dispersion" contains, sometimes among other ingredients, discrete particles that are suspended in a continuous medium. When the continuous medium contains at least 50% water by weight, based on the weight of the continuous medium, the dispersion is said to be an "aqueous dispersion," and the continuous medium is said to be an "aqueous medium." When at least some of the suspended discrete particles in the dispersion contain one or more polymers, the dispersion is said herein to be a "polymer dispersion." Thus, an "aqueous polymer dispersion" contains some polymer-containing particles suspended in a continuous medium that is at least 50% water.

The group of polymer particles in a sample of an aqueous polymer dispersion have a variety of sizes. In some cases, the polymer particles are spherical or nearly spherical; in such cases their sizes can usefully be characterized by their diameters, and the group of polymer particles can be usefully characterized by the average diameter of the particles. One useful method of measuring the average diameter of the particles is light scattering. In some embodiments, the average diameter of the particles is 80 nm or larger; or 100 nm or larger; or 125 nm or larger. Independently, in some embodiments, the average diameter of the particles is 1,000 nm or smaller; or 500 nm or smaller; or 250 nm or smaller. In some embodiments, the average diameter of the particles is smaller than 150 nm.

The polymer of the aqueous polymer dispersion of the present invention is formed by the polymerization of monomers; the aggregate of all monomers used to form the polymer is known herein as the "monomer mix." Monomers in the monomer mix may be of any type and may polymerized by any method or mechanism.

In the practice of the present invention, the monomer mix contains 5% or more by weight of one or more carboxylic acid functional monomers, based on the weight of the monomer mix. In some embodiments, the monomer mix contains 7% or more; or 9% or more, by weight of one or more carboxylic acid functional monomers, based on the weight of the monomer mix. In the practice of the present invention, the monomer mix contains 50% or less by weight of one or more carboxylic acid functional monomers, based on the weight of the monomer mix. In some embodiments of the present invention, the monomer mix contains 20% or less by weight of one or more carboxylic acid functional monomers, based on the weight of the monomer mix. In some embodiments, the monomer mix contains 15% or less; or 12% or less, by weight of one or more carboxylic acid functional monomers, based on the weight of the monomer mix.

Carboxylic acid functional monomers are compounds capable of polymerization that contain at least one carboxylic acid group. The carboxylic acid group may be in the form of a neutral carboxylic acid group, in the form of a carboxylate ion, or in any mixture or combination thereof. In some embodiments, carboxylic acid functional monomers are used that have carboxylic acid functional groups, and the carboxylic acid functional groups are not removed or altered during the process of polymerization. Also contemplated for use in the present invention are monomers with other functional groups that, after polymerization, are converted to carboxylic acid functional groups.

The monomer mix of the present invention contains monomers other than carboxylic acid functional monomers, known herein as "non-carboxyl monomers." The non-carboxyl monomer or monomers may be of any type that is capable of forming a copolymer with the carboxylic acid functional monomers that are used. Copolymer, as used herein, refers to a polymer made from two or more different monomers that react together to form a polymer. Copolymers may have any structure; for example, the different monomers may be arranged randomly, in a pattern (such as, for example, alternation), in blocks, in branches, in a star, or in any combination thereof.

In some embodiments, some or all of the monomers in the monomer mix are vinyl monomers (i.e., monomers that each contain at least one vinyl group).

Some suitable carboxylic acid functional vinyl monomers are, for example, vinyl compounds with at least one carboxylic acid functional group, such as, for example, alpha, beta monoethylenically unsaturated acids; partial esters of unsaturated aliphatic dicarboxylic acids and the alkyl half esters of such acids; and mixtures thereof. Some suitable alpha, beta monoethylenically unsaturated acids are, for example, maleic acid, fumaric acid, aconitic acid, crotonic acid, citraconic acid, acryloxypropionic acid, acrylic acid, methacrylic acid (MAA), itaconic acid, and mixtures thereof MAA is known to be a suitable alpha, beta monoethylenically unsaturated acid. Some suitable alkyl half esters of unsaturated aliphatic dicarboxylic acids are, for example, the alkyl half esters of itaconic acid, fumaric acid and maleic acid. Some suitable alkyl groups for such alkyl half esters are, for example, alkyl groups with 1 to 6 carbon atoms. Some examples of such alkyl half esters are methyl acid itaconate, butyl acid itaconate, ethyl acid fumarate, butyl acid fumarate, methyl acid maleate, and mixtures thereof.

Some suitable non-carboxyl vinyl monomers are, for example, vinyl aromatic monomers; alkyl esters of (meth) acrylic acid; nonionogenic vinyl monomers that are polar or polarizable; esters of hydroxy vinyl moieties with carboxylic acids; other non-carboxyl ethylenically unsaturated compounds; and mixtures thereof.

Some suitable vinyl aromatic monomers are, for example, alpha, beta monoethylenically unsaturated aromatic monomers. Some suitable alpha, beta monoethylenically unsaturated aromatic monomers are, for example, styrene (Sty), vinyl toluene, 2-bromo styrene, o-bromo styrene, p-chloro styrene, o-methoxy styrene, p-methoxy styrene, allyl phenyl ether, allyl tolyl ether, alpha-methyl styrene, and mixtures thereof. Styrene is known to be a suitable vinyl aromatic monomer. In some embodiments, the monomer mix contains at least one vinyl aromatic monomer, in an amount by weight, based on the weight of the monomer mix, of 15% or more, or 25% or more. Independently, in some embodiments, the monomer mix contains at least one vinyl aromatic monomer, in an amount by weight, based on the weight of the monomer mix, of 55% or less, or 45% or less.

Some suitable alkyl esters of (meth)acrylic acid are, for example, those in which the alkyl group has 20 or fewer carbon atoms, or 12 or fewer carbon atoms, or 8 or fewer carbon atoms. The alkyl group in suitable alkyl esters of (meth)acrylic acid may be linear, branched, cyclic, or any combination or mixture thereof. Some examples of suitable alkyl esters of (meth)acrylic acid are methyl methacrylate (MMA), methyl acrylate, ethyl acrylate, ethyl methacrylate, n-butyl acrylate (BA), butyl methacrylate (BMA), iso-butyl methacrylate (IBMA), 2-ethylhexyl acrylate, n-octyl acrylate, sec-butyl acrylate, cyclopropyl methacrylate, isobornyl methacrylate, and mixtures thereof. In some embodiments, the monomer mix contains BA, MMA, or a mixture thereof.

In some embodiments, the monomer mix contains at least one alkyl acrylate, in an amount by weight, based on the weight of the monomer mix, of 10% or more, or 20% or more. In some embodiments, the monomer mix contains at least one alkyl acrylate, in an amount by weight, based on the weight of the monomer mix, of 60% or less, or 50% or less.

In some embodiments, the monomer mix contains at least one alkyl methacrylate, in an amount by weight, based on the weight of the monomer mix, of 4% or more, or 8% or more. In some embodiments, the monomer mix contains at least one alkyl methacrylate, in an amount by weight, based on the weight of the monomer mix, of 45% or less, or 35% or less.

In some embodiments, the monomer mix contains at least one nonionogenic vinyl monomer that is polar or polarizable. Some examples of such monomers are acrylonitrile, methacrylonitrile, cis- and trans-crotononitrile, alpha-cyanostyrene, alpha-chloroacrylonitrile, ethyl vinyl ether, isopropyl vinyl ether, isobutyl- and butyl-vinyl ether, diethylene glycol vinyl ether, decyl vinyl ether, vinyl acetate, hydroxyalkyl (meth) acrylates such as 2-hydroxy ethyl methacrylate, 2-hydroxyethyl acrylate, 3-hydroxy propyl methacrylate, butanediol acrylate, 3-chloro-2-hydroxypropyl acrylate, 2-hydroxypropyl acrylate, 2-hydroxypropyl methacrylate, and mixtures thereof.

Some additional examples of nonionogenic vinyl monomers that are polar or polarizable are those that contain sulfur. Among sulfur-containing nonionogenic vinyl monomers that are polar or polarizable are vinyl thiols such as, for example, 2-mercaptopropyl methacrylate, 2-sulphoethyl methacrylate, methyl vinyl thiol ether, and propyl vinyl thiol ether. In some embodiments, the monomer mix contains one or more sulfur-containing nonionogenic vinyl monomers that are polar or polarizable. In other embodiments, the monomer mix contains no sulfur-containing nonionogenic vinyl monomers that are polar or polarizable.

Some further examples of nonionogenic vinyl monomers that are polar or polarizable are ethylenically unsaturated monomers that contain at least one acetoacetate or acetoacetamide grouping. In some embodiments of the present invention, the monomer mix includes one or more monomers that contain at least one acetoacetate or acetoacetamide grouping. In other embodiments of the present invention, the monomer mix excludes monomers that contain at least one acetoacetate or acetoacetamide grouping.

In some embodiments, the monomer mix contains at least one ester of a hydroxy vinyl moiety with a carboxylic acid. In some embodiments, the carboxylic acid portion of such an ester is selected from the aromatic and aliphatic carboxylic acids. Suitable aliphatic carboxylic acids include, for example, those with 1 to 18 carbon atoms. Such aliphatic carboxylic acids include, for example, formic, acetic, propionic, n-butyric, n-valeric, palmitic, stearic, phenyl acetic, benzoic, chloroacetic, dichloroacetic, gamma-chloro butyric, 4-chlorobenzoic, 2,5-dimethyl benzoic, o-toluic, 2,4,5-trimethoxy benzoic, cyclobutane carboxylic, cyclohexane carboxylic, 1-(p-methoxy phenyl)cyclohexane carboxylic, 1-(p-tolyl)-1-cyclopentane carboxylic, hexanoic, myristic, and p-toluic acids. The hydroxy vinyl moiety of such an ester may be, for example, selected from hydroxy vinyl compounds such as hydroxy ethylene, 3-hydroxy-pent-1-ene, 3,4-dihydroxybut-1-ene, and 3-hydroxy-pent-1-ene.

It is to be understood herein that, when a compound is described as an ester of a certain hydroxy moiety and a particular acid, such a description refers to the structure of the ester and not necessarily to the actual method by which the ester is made.

In some embodiments, the monomer mix contains one or more monomers with at least one sulfur-containing acid functional group. Sulfur-containing acid functional groups include sulfate and sulfonate groups. In some embodiments, the monomer mix contains no monomers with sulfate groups or sulfonate groups. In some embodiments, the monomer mix includes no monomers with any sulfur-containing acid functional group. In some embodiments, the monomer mix includes no monomers that contain sulfur.

An aqueous polymer dispersion of the present invention may be made by any of a wide variety of methods. In some embodiments, the polymer may be formed by any polymerization method and then dispersed in water. In some embodiments, the polymer is formed as suspended particles in an aqueous medium, for example, by suspension polymerization, emulsion polymerization, microemulsion polymerization, or a combination thereof.

In some embodiments, the polymer is formed by emulsion polymerization. The practice of emulsion polymerization is discussed in detail in D. C. Blackley, *Emulsion Polymerization* (Wiley, 1975). For example, the monomers may be emulsified with anionic or nonionic dispersing agents; about 0.5% to 10% thereof on the weight of total monomers being used. A polymerization initiator of the free radical type, such as, for example, ammonium or potassium persulphate, may be used alone or in conjunction with an accelerator, such as, for example, potassium metabisulphate or sodium thiosulphate. The initiator and accelerator (if used), commonly referred to as catalysts, may conveniently be used in proportions of 0.5% to 2% each based on the weight of monomers to be copolymerized. The polymerization temperature may for example be from room temperature to 90° C., or more, as is conventional.

Examples of emulsifiers which are suited to the polymerization process useful in this invention include, for example, alkaline metal and ammonium salts of alkyl, aryl, alkyl-substituted aryl and aryl-substituted alkyl sulphonates, sulphates and polyether sulphates, such as sodium vinyl sulphonate, and sodium methallyl sulphonate; the corresponding phosphates and phosphonates, such as phosphoethyl methacrylate; and alkoxylated fatty acids, esters, alcohols, amines, amides and alkylphenols.

Chain transfer agents, including, for example, mercaptans, polymercaptans and polyhalogen compounds, are sometimes used in the polymerization mixture to control polymer molecular weight.

Among embodiments in which at least one polymer of the present invention is made by emulsion polymerization, any of the various types of emulsion polymerization may be used. For example, in some embodiments, a "single stage" emulsion polymerization is used, in which the monomer mix, sometimes in emulsified form, is either added all at once to the reaction container or is added gradually to the reaction container during the polymerization reaction. Alternatively, in some embodiments, a "multi-stage" emulsion polymerization is used, in which the monomer mix is provided as two or more portions of different compositions; after each portion is polymerized, all or part of the resulting polymer is kept in or is placed into a vessel, and a subsequent portion of monomer mix is added to that vessel and polymerized.

As stated herein above, "monomer mix" is contemplated herein to mean the aggregate of all monomers used to make the polymer of the present invention, regardless of the physical form in which the monomer mix is used. For example, in some embodiments, the monomer mix is provided as a single physical mixture in a single container. In some embodiments, the monomer mix is provided as two or more mixtures (which may be the same as each other or may be different from each other) of monomers in two or more different containers.

It is sometimes useful to characterize the aqueous polymer dispersion by its minimum film formation temperature MFT (also sometimes called "MFFT"). MFT can be measured, for example, by ASTM method D2354-98. When the aqueous polymer dispersion is dried, the minimum temperature necessary for the dry polymer to form a film is the MFT. In the practice of the present invention, it is useful to characterize the aqueous polymer dispersion in the absence of added swelling agent, added metal cation, and added adjuvant. In general, aqueous polymer dispersions of the present invention may have any MFT; a person practicing the present invention can readily choose an aqueous polymer dispersion with MFT appropriate for the intended use. In some embodiments, the aqueous polymer dispersion has MFT of 40° C. or higher, or 60° C. or higher.

The practice of the present invention involves the use of at least one polyvalent metal cation, which means herein a metal cation with charge of +2 or higher. Suitable polyvalent metal cations are, for example, polyvalent cations of alkaline earth metals and polyvalent cations of transition metals. Among the suitable metals whose polyvalent cations are suitable for use in the present invention are, for example, magnesium, arsenic, mercury, cobalt, iron, copper, lead, cadmium, nickel, chromium, aluminum, tungsten, tin, zinc, zirconium, and mixtures thereof. In some embodiments, one or more of zinc, copper, magnesium, and mixtures thereof are used. In some embodiments, zinc is used. In some embodiments, magnesium is used.

In some embodiments, at least one polyvalent metal ion is used in the form of a complex. Some suitable complexes include, for example, carbonates, bicarbonates, and glycinates. In some embodiments, it is useful to solubilize such a complex prior to adding it to an aqueous polymer dispersion. One method to solubilize such a complex is to add the complex to dilute aqueous ammonia; the result is named by inserting "ammonia" into the name of the original complex. For example, when cadmium glycinate is solubilized by addition to aqueous ammonia, the result is named "cadmium ammonia glycinate." Similarly solubilized complexes are zinc ammonia glycinate and zinc ammonia bicarbonate.

In some embodiments, the polyvalent metal cation, prior to its addition to the composition, is in the form of an insoluble metal compound. "Insoluble," as used herein, means a compound that has solubility in water of less than 4.2 g of compound in 100 g of water. Suitable insoluble metal compounds include, for example, oxides, hydroxides, carbonates, acetates, and mixtures thereof. One suitable insoluble metal compound is zinc oxide.

The amount of polyvalent metal cation in the composition of the present invention is characterized by the number of equivalents. For each type of polyvalent metal cation that is present, the number of equivalents of that polyvalent metal cation is the number of moles of the cation that is present, multiplied by the valency of the cation. One mole of divalent metal cations provides two equivalents; one mole of trivalent metal cations provides three equivalents; and so on.

In compositions of the present invention, the ratio of the equivalents of polyvalent metal cations present in the composition to the equivalents of carboxyl groups (including both carboxylate groups and neutral carboxyl groups) is 0.4 or higher. In some embodiments, that ratio is 0.6 or higher; or 0.7 or higher; or 0.8 or higher. Independently, in some embodiments, that ratio is 1.2 or lower; or 1.0 or lower; or 0.9 or lower.

The practice of the present invention involves the use of at least one swelling agent. A "swelling agent" as used herein is a compound that interacts with a polymer in a way that increases the flexibility of that polymer. In some embodiments, the swelling agent is an organic compound. Independently, in some embodiments, the swelling agent is a non-polymeric compound. In some embodiments, the swelling agent is a non-polymeric organic compound.

While the present invention may be practiced with any polyvalent metal cation, one way of testing whether a compound of interest suitable as a swelling agent for a particular aqueous polymer dispersion is to perform a zinc uptake test, as described in the Examples herein below, with that aqueous polymer dispersion and the compound of interest. A compound of interest that results in a detectable decrease in zinc precipitate is a suitable swelling agent.

An alternative method of testing whether a compound of interest is suitable as a swelling agent for a particular aqueous polymer dispersion is to measure the MFT (as defined herein above) of that aqueous polymer dispersion with and without the presence of the compound of interest. That is, the MFT of the aqueous polymer dispersion itself is measured. Also, the compound of interest is admixed with the aqueous polymer dispersion, and the MFT of the admixture is measured. If the MFT of the admixture is lower than the MFT of the aqueous polymer dispersion itself, then the compound of interest is suitable as a swelling agent of the present invention.

Among the suitable swelling agents that are organic compounds, a wide variety are contemplated. Some suitable swelling agents are, for example, solvents, surfactants, dispersants, plasticizers, or coalescents. Some suitable swelling agents are highly volatile, such as, for example, many solvents. Some suitable swelling agents are moderately volatile, such as, for example, coalescents. Some suitable swelling agents are only slightly volatile or are non-volatile, such as, for example, many plasticizers, surfactants, and dispersants. In some embodiments, the swelling agent includes one or more plasticizers, one or more coalescents, or a mixture thereof.

Swelling agents suitable in the present invention include, for example, alcohols, ether compounds, carboxylate esters, phosphate esters, amides, and mixtures thereof.

Some alcohols suitable as swelling agents include, for example, aliphatic alcohols with 2 to 10 carbon atoms. Some suitable alcohols are, for example, isopropanol, butanol, 2-ethylhexanol, and pine oil.

Some ether compounds suitable as swelling agents are, for example, alkyl and aromatic ethers of monoalkylene glycols and multialkylene glycols, where "multi-" means "di-" or "tri-" or higher; alkylene glycol means a glycol with 2 or 3 or more carbon atoms; and in the case of alkyl ethers, the alkyl group has 1, 2, or more carbon atoms. Some suitable alkyl ethers of multialkylene glycols are, for example, diethylene glycol ethyl ether, dipropylene glycol methyl ether, and mixtures thereof.

Further ether compounds suitable as swelling agents are, for example, ether alcohols, which are compounds containing at least one ether link and at least one hydroxyl group. Some suitable ether alcohols are, for example, 2-butoxy ethanol and butyl carbitol.

Another group of compounds suitable as swelling agents are carboxylate esters, which are compounds containing at least one ester link. Carboxylate esters are described herein as "esters of" a hydroxyl compound and a carboxylic acid; it is to be understood that such a description refers to the structure of the ester, whether not the ester is made by reacting that hydroxyl compound with that carboxylic acid. "Mono-hydroxyl" compound as used herein is a compound with a single hydroxyl group. "Polyol" as used herein is a compound with two or more hydroxyl groups. "Monocarboxylic acid" as used herein is a compound with a single carboxylic acid group. "Multicarboxylic acid" as used herein is a compound with two or more carboxylic acid groups.

Some carboxylate esters suitable as swelling agents are, for example, esters of mono-hydroxyl compounds and monocarboxylic acids. Suitable monocarboxylic acids include, for example, aromatic monocarboxylic acids (such as, for example, benzoic acid) and aliphatic monocarboxylic acids. Suitable aliphatic monocarboxylic acids include, for example, alkyl monocarboxylic acids with 4 to 8 carbon atoms. Suitable mono-hydroxyl compounds include, for example, mono-hydroxyl alkyl compounds such as, for example, those with straight or branched alkyl groups with 3 to 13 carbon atoms.

Some further carboxylate esters suitable as swelling agents are, for example, mono- and di-esters of mono-hydroxyl compounds and multicarboxylic acids. Suitable multicarboxylic acids include, for example, aromatic multicarboxylic acids (such as, for example, phthalic acid and trimellitic acid) and aliphatic multicarboxylic acids. Some suitable aliphatic multicarboxylic acids are, for example, oxalic acid, fumaric acid, maleic acid, adipic acid, and pimelic acid. Suitable mono-hydroxyl compounds include, for example, mono-hydroxyl alkyl compounds such as, for example, those with straight or branched alkyl groups with 3 to 13 carbon atoms.

Also suitable are alkyl and aromatic mono- and di-esters of the glycols described herein above and monocarboxylic acids.

Additional carboxylate esters suitable as swelling agents are, for example, mono-, di- and higher esters of alkyl polyols and monocarboxylic acids. Suitable alkyl polyols are those with 4 or more, or 6 or more, or 8 or more, carbon atoms. Suitable monocarboxylic acids are, for example, alkyl carboxylic acids with 3 or 4 carbon atoms. Some examples of suitable esters are the following: Texanol™ (from Eastman Chemical), mono- and di-alkyl esters of iso-octane diol, and mono- and di-alkyl esters of butane diol.

Some phosphate esters suitable as swelling agents are, for example, trialkyl phosphates (such as, for example, tri-2-ethylhexyl phosphate), triaryl phosphates (such as, for example, tricresyl phosphate), and mixed alkyl/aryl phosphates (such as, for example, 2-ethylhexyl diphenyl phosphate).

One suitable amide swelling agent is, for example, caprolactam.

Mixtures of suitable swelling agents are also suitable.

The amount of swelling agent used in the practice of the present invention can be characterized by the weight of swelling agent compared to the weight of the monomer mix. For 100 parts by weight of monomer mix, the amount of swelling agent is 1 or more parts by weight, or 2 or more parts by weight, or 3 or more parts by weight, or 4 or more parts by weight. Independently, for 100 parts by weight of monomer mix, the amount of swelling agent is 10 or less parts by weight, or 7 or less parts by weight, or 5 or less parts by weight.

In the practice of the present invention, some or all of the at least one swelling agent is admixed with the aqueous polymer dispersion, and the result is herein called a "preliminary admixture." The preliminary admixture contains at least 1 part by weight of at least one swelling agent, based on 100 parts by weight of monomer mix. The preliminary admixture contains no polyvalent metal cation or contains a relatively small amount of polyvalent metal cation. The ratio of equivalents of polyvalent metal cation in the preliminary admixture to equivalents of carboxylic acid functional groups in the preliminary admixture is 0.25 or less. In some embodiments the ratio of equivalents of polyvalent metal cation in the preliminary admixture to equivalents of carboxylic acid functional groups in the preliminary admixture is 0.1 or less, or 0.05 or less; or 0.01 or less.

The preliminary admixture may be formed by any technique, under any conditions. In some embodiments, the preliminary admixture may be formed at elevated temperature (higher than 35° C.). In other embodiments, the preliminary admixture may be formed at 35° C. or lower, or at 30° C. or lower.

In the practice of the present invention, subsequent to forming the preliminary admixture, the preliminary admixture is admixed with at least one polyalent metal cation to form a subsequent admixture. The ratio of equivalents of polyvalent metal cation in the subsequent admixture to equivalents of carboxylic acid functional groups in the subsequent admixture is 0.4 or more. In some embodiments, the ratio of equivalents of polyvalent metal cation in the subsequent admixture to equivalents of carboxylic acid functional groups in the subsequent admixture is 0.5 or more; or 0.6 or more; or 0.7 or more; or 0.8 or more. The ratio of equivalents of polyvalent metal cation in the subsequent admixture to equivalents of carboxylic acid functional groups in the subsequent admixture is 1.2 or lower. In some embodiments, the ratio of equivalents of polyvalent metal cation in the subsequent admixture to equivalents of carboxylic acid functional groups in the subsequent admixture is 1.0 or lower, or 0.9 or lower.

The subsequent admixture may be formed by any technique, under any conditions. In some embodiments, the subsequent admixture may be formed at elevated temperature (higher than 35° C.). In other embodiments, the subsequent admixture may be formed at 35° C. or lower, or at 30° C. or lower. Independently, in some embodiments, the subsequent admixture is formed at temperature less than the MFT of the aqueous polymer dispersion. Independently, in some embodiments, the subsequent admixture is formed at temperature approximately equal to the MFT of the aqueous polymer dispersion.

In some embodiments, the subsequent admixture is formed at a temperature above the Tg of the polymer of the aqueous polymer dispersion. By "Tg of the polymer" is meant herein the Tg as calculated by the Fox equation (T. G. Fox, *Bulletin of the American Physical Society*, series II, volume 1, 1956, p. 123), based only on the monomers in the monomer mix and not based on other ingredients admixed with the polymer. In other embodiments, the subsequent admixture is formed at a temperature equal to or below the Tg of the polymer of the aqueous polymer dispersion, including, for example, embodiments in which the temperature of formation of the subsequent admixture is lower than the Tg of the polymer of the aqueous polymer dispersion by a difference of 4° C. or more, or by a difference of 10° C. or more.

In some embodiments, the subsequent admixture is formed while the pH of the aqueous polymer dispersion is 7 or less; this condition is contemplated to be useful, for example, when some or all of the polyvalent metal cation is in the form of an insoluble metal compound. In other embodiments, the subsequent admixture is formed while the pH of the aqueous polymer dispersion is higher than 7.

Also contemplated are embodiments in which all or part of the swelling agent and all or part of the polyvalent metal cation are added simultaneously to aqueous polymer dispersion. The ingredients may be added at any concentration or feed rate. Such a method is considered to be an embodiment of the present invention if, at some point during the simultaneous addition, 1 to 10 parts by weight (based on 100 parts by weight of the monomer mix used to form the aqueous polymer dispersion) of swelling agent is present in the admixture at a time when the ratio of equivalents of polyvalent metal ions in the admixture to equivalents of carboxylic acid functional groups in the admixture is 0.25 or less, and if, in the admixture after the addition of swelling agent and polyvalent metal cation is finished, the ratio of equivalents of polyvalent metal ions in the admixture to equivalents of carboxylic acid functional groups in the admixture is 0.4 or more.

In some embodiments, after the formation of the subsequent admixture, no further swelling agent is added to the composition. In other embodiments, some portion of at least one swelling agent (for example, one or more plasticizers, one or more coalescents, or one or more of each) is added to the composition after the formation of the subsequent admixture.

In some embodiments, the composition of the present invention also includes one or more basic salt of an alkaline metal. Basic salts of alkaline metals include, for example, sodium hydroxide, potassium hydroxide, and mixtures thereof. In some of the embodiments in which one or more basic salt of an alkaline metal is used, the molar ratio of polyvalent metal cation to alkaline metal in the composition is 0.1 to 10. In some embodiments, small amounts of alkaline metal are present in the composition; in such embodiments, the molar ratio of alkaline metal to polyvalent metal cation in the composition is 0.02 or less; or 0.01 or less; or 0.005 or less. In some embodiments, no basic salt of an alkaline metal is used.

In some embodiments, the composition of the present invention contains ingredients, known herein as "adjuvants," in addition to those described herein above. Adjuvants, when present, include, for example, waxes (including, for example, wax emulsions), surfactants, wetting agents, emulsifying agents, dispersing agents, leveling agents, cosolvents, thickeners (including, for example, alkali swellable resins and alkali soluble resins), and mixtures thereof. Adjuvants, when present, may be added at any point in the formation of the composition of the present invention. Some adjuvants, for example, may be added as part of the process of forming the aqueous polymer dispersion and will remain in the composition. Some adjuvants, for example, may be added to one or more of the ingredients or to one or more of the admixtures, to improve the properties of the composition. Some of these adjuvants may reside in any one of or any combination of the following locations: inside the suspended particles of the aqueous polymer dispersion, on the surface of the suspended particles of the aqueous polymer dispersion, or in the continuous medium.

In some embodiments, one or more amphoteric surfactant is included in the composition. In other embodiments, no amphoteric surfactant is used.

In some embodiments, one or more surfactant is added to the composition after the formation of the aqueous polymer dispersion. Such surfactant is herein called "cosurfactant." Cosurfactant, if present, is in addition to any surfactants that may have been used in the production of the aqueous polymer dispersion. One or more cosurfactant may be added to the composition of the present invention at any point in the process of forming the composition, including, for example, one of, or any combination of, the following points: cosurfactant may be admixed with aqueous polymer dispersion before aqueous polymer dispersion is admixed with swelling agent; cosurfactant may be admixed with swelling agent before aqueous polymer dispersion is admixed with swelling agent; cosurfactant may be admixed with polyvalent metal cation complex before polyvalent metal cation complex is admixed with preliminary admixture.

Suitable cosurfactants may be any type of surfactant. Cosurfactants are preferably chosen to be compatible with the aqueous polymer dispersion so as to avoid coagulating or otherwise degrading the aqueous polymer dispersion. Cosurfactants may be cationic, anionic, nonionic, or a mixture thereof. In some embodiments, cosurfactants are nonionic surfactants. Among the nonionic surfactants suitable as cosurfactant are, for example, alkoxylates, sulfates, sulfonates, phosphate esters, copolymers of ethylene oxide and propylene oxide, and mixtures thereof. Among the suitable alkoxylates are, for example, ethoxylates, which have the structure

where R is an aliphatic group, an aromatic group, an aliphatic-substituted aromatic group, and aromatic-substituted aliphatic group, or a mixture thereof; and x is from 5 to 200. In some embodiments R is alkyl-substituted benzene, with the structure $R^1$-$R^2$-, where $R^1$ is a linear alkyl group and $R^2$ is an aromatic ring. One suitable cosurfactant is octylphenol ethoxylate. In some embodiments, R is an alkyl group, attached to the oxygen atom either at the end carbon or at another carbon. Mixtures of suitable cosurfactants are suitable.

Among embodiments in which cosurfactant is used, the amount of cosurfactant can be characterized by the ratio of the solid weight of cosurfactant to the solid weight of swelling agent. In some embodiments, this ratio is 0.05 or more; or 0.1 or more; or 0.2 or more; or 0.4 or more. Independently, in some embodiments, this ratio is 10 or less; or 5 or less; or 2 or less; or 1 or less.

While the invention is not limited to any particular mechanism or theory, it is contemplated that the polyvalent metal cations and the carboxylic acid functional groups are, in some embodiments, capable of interacting in a way that provides the effect of crosslinking of the polymer. The effect of crosslinking can, for example, provide one or more desirable properties to the dried layer of the composition, such as, for example, hardness, durability, other useful properties, or a combination thereof.

The compositions of the present invention are useful for a variety of purposes. In some embodiments, one or more layers of the composition is applied to a substrate and is dried or allowed to dry. In some embodiments, such a layer of the composition resides mostly or completely on the surface of the substrate, and the composition is considered a coating. In some embodiments, the subsequent admixture, optionally further admixed with one or more adjuvants, is intended for use as a coating and is known as a coating material.

For example, one or more layers of the composition of the present invention may be applied to any of a wide variety of substrates including, for example, leather, roofs, and floors.

In some embodiments, a coating material that contains a composition of the present invention is used to coat a floor. Such a coating material is known herein as a "floor polish." Some floor polishes contain one or more adjuvants; common adjuvants in floor polishes include, for example, wax emulsions, alkali soluble resins, wetting agents, emulsifying agents, dispersing agents, defoamers, leveling agents, and mixtures thereof. In some embodiments, a floor polish contains an aqueous polymer dispersion with average particle diameter of 100 nm or larger, or 130 nm or larger. Independently, in some embodiments, a floor polish contains an aqueous polymer dispersion with average particle diameter 300 nm or smaller; or 200 nm or smaller; or 150 nm or smaller. Independently, in some embodiments, a floor polish contains an aqueous polymer dispersion with average particle diameter 75 nm or larger; or 100 nm or larger. Independently, in some embodiments, a floor polish contains an aqueous polymer dispersion that is made by emulsion polymerization.

Embodiments of the present invention that are used as part or all of a floor polish ("floor polish embodiments") include, for example, embodiments in which the Tg of the polymer is 35° C. or higher; or 40° C. or higher. Independently, in some floor polish embodiments, the Tg of the polymer is 70° C. or lower; or 65° C. or lower. Independently, in some floor polish embodiments, the Tg of the floor polish formulation (including all ingredients, including polymer, swelling agent, adjuvants if used, etc.) is higher that 25° C.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. For another example, if minimum values for a particular parameter of 1, 2, and 3 are recited, and if maximum values of 4 and 5 are recited for that parameter, then it is also understood that the following ranges are all contemplated: 1 to 4, 1 to 5, 2 to 4, 2 to 5, 3 to 4, and 3 to 5.

EXAMPLES

Example 1

Preparation of Latex Polymer

An emulsified monomer mixture was prepared by slowly adding the following monomers in sequence to a stirred solution of 117.5 g of a 23% (by weight) solution of sodium dodecylbenzene sulfonate in 2100 g of deionized water: 1980 g butyl acrylate (BA), 2970 g methyl methacrylate (MMA), 3150 g styrene (Sty), and 900 g methacrylic acid (MAA).

In a reaction vessel equipped with thermometer, condenser, and stirrer, a solution of 4250 g deionized water and 156.5 g sodium dodecylbenzene sulfonate solution (23% by weight in water) and 30 g sodium sulfate was heated to 87° C. under nitrogen. A 225 g portion of the monomer mixture was added all at once to the reaction vessel, and the temperature was adjusted to between 80° C. and 82° C. A solution of 39 g ammonium persulfate in 90 g deionized water was made and then added all at once to the reaction vessel. After an exotherm of 2° C. to 3° C. had ceased, the remaining monomer mixture was gradually fed to the reaction mixture along with a cofeed solution (7.5 g ammonium persulfate, 50 g ammonium bicarbonate, and 340 g deionized water). The rate of addition was chosen so that the temperature remained between 80° C. and 84° C. After additions were complete, the containers and feed lines were rinsed to the reaction vessel, and the contents of the reaction vessel were cooled to 40° C.

Example 2

Aqueous Polymer Dispersions

The following monomer mixes were prepared:

| Monomer Mix | parts[1] BA | parts[1] Sty | parts[1] MMA | parts[1] MAA |
|---|---|---|---|---|
| A | 28 | 35 | 27 | 10 |
| B | 28 | 35 | 25 | 12 |
| C[7] | 22 | 35 | 33 | 10 | note [1]: parts by weight, based on 100 parts by weight of monomer mix
note [7]: Polymer C was the monomer mix used in example 1.

Comparative Examples 2C and 3C; and Examples 4-6

Zinc Uptake Test

A zinc complex was formed by mixing 368.82 g zinc oxide, 423.15 g ammonium bicarbonate, 423.15 g ammonium hydroxide solution (28% by weight in water), and 1125 g deionized water.

Using the methods of Example 1, latex polymers were made from the monomer mixes described in Example 2.

A variety of admixtures were formed. The polymers and swelling agents varied, as shown in the table below. The cosurfactant was a nonionic surfactant.

Each latex polymer that was used is characterized by its "monomer mix" in the table below.

Each latex polymer was stirred at 40° C.; cosurfactant (if used) and swelling agent (if used) were gradually added over 20 minutes; and the admixture was then stirred for an additional 10 minutes. With stirring at 40° C., the zinc complex was added gradually over 30 minutes, and the resulting admixture was stirred at 40° C. for 10 minutes. The amount of zinc complex added was calculated to give the zinc amount shown in the table below for each example. The admixture was cooled to room temperature (approximately 20° C.) and filtered through a 325 mesh screen. Then, each admixture was allowed to stand at room temperature (approximately 20° C.) overnight. Then each admixture was examined to observe whether any precipitate had formed. It is contemplated that any precipitate was a zinc compound.

Example 7

Floor Polish

Floor polishes were made by mixing the following ingredients in the order shown in the following formulation.

| Ingredient | Amount, kg (lbs) |
|---|---|
| Water | 11.81 (26.03) |
| Kathon ™ CG biocide (1.5% by weight, in water) | 0.01 (0.03) |
| Rhoplex ™ 1531 resin[9] | 1.60 (3.53) |
| Ammonia (28% by weight, in water) | 0.11 (0.25) |
| Masurf ™ FS-230 wetting aid (1% by weight, in water)[10] | 0.91 (2.00) |
| Diethylene glycol monoethyl ether | 2.04 (4.50) |
| Dipropylene glycol methyl ether | 1.13 (2.50) |
| Tributoxy ethyl phosphate | 1.47 (3.25) |
| Latex polymer (46.3% by weight, in water) of Example 6 | 20.92 (46.13) |
| AC-316N wax emulsion (30% by weight, in water)[11] | 3.05 (6.72) |
| Epolene ™ E43N wax emulsion[12] | 2.28 (5.03) |
| SE-21[13] | 0.02 (0.04) | note [9]: Alkali swellable resin, from Rohm and Haas Co.
note [10]: Fluorocarbon Wetting Aid from Mason Chemical
note [11]: Polyethylene wax emulsion from Chemcor
note [12]: Nonionic polyethylene/maleic anhydride wax emulsion from Chemcor
note [13]: Silicone-based defoamer from Wacker

Example 8

Testing of Floor Polishes

The following test methods were used:

Coating Application and Testing: The method for applying the floor polish (base coat or top coat) to substrates for testing purposes is described in "Annual Book of ASTM Standards," Section 15, Volume 15.04, Test Procedure ASTM D 1436 (2000). Test Method B (application of emulsion floor polish with a hand applicator) was used.

Gloss and Recoat Gloss: The method for determining the gloss performance of polish compositions is described in "Annual Book of ASTM Standards, Section 15, Volume 15.04, Test Procedure ASTM D 1455. A Gardner Byk Micro-Tri-Gloss meter, catalog number 4520, was used to record 60° and 200 gloss.

Recoatability: The method for determining the recoatability of water-based emulsion floor polishes is described in "Annual Book of ASTM Standards," Section 15, Volume 15.04, Test Procedure ASTM D 3153.

| Example | Monomer Mix | Cosurfactant amount[2] | Swelling agent type | swelling agent amount[2] | zinc amount[3] | precipitate amount |
|---|---|---|---|---|---|---|
| 2C[4] | A | 0 | none[9] | 0 | 0.39 | large |
| 3C[4] | B | 0 | none[9] | 0 | 0.44 | large[5] |
| 4 | B | 2 | caprolactam | 2 | 0.44 | light[6] |
| 5 | B | 2 | caprolactam | 4.65 | 0.75 | none |
| 6 | C | 2 | note[8] | 4 | 0.90 | none | note [2]: parts by weight of solid cosurfactant, based on 100 parts of monomer mix
note [3]: ratio of equivalents of zinc to equivalents of carboxylic acid groups
note [4]: comparative example
note [5]: from the large amount of precipitate that was observed, it is contemplated that the amount of zinc that remained in the composition was less than 0.4.
note [6]: from the small amount of precipitate that was observed, it is contemplated that the amount of zinc that remained in the composition was more than 0.4.
note [8]: Texanol ™ from Eastman Chemical Film Formation: A draw-down using 0.4 ml of the coating composition was applied by means of a 2 inch (5.08 cm) wide blade applicator (as specified in ASTM D 1436), having a clearance of 0.008 inches (0.02 cm), to a length of 4 inches (10.16 cm) on a vinyl composition tile. Immediately after application of the polish, the tile was placed on a level surface in a refrigerator at 10° C. The dried film was rated as follows:

Excellent—No crazing

Very Good—Slight edge crazing

Good—Definite edge crazing

Fair—Definite edge crazing with very slight center crazing

Poor—Complete edge and center crazing

Black Heel Mark and Scuff Resistance: The method for determining black heel and scuff resistance is described in Chemical Specialty Manufacturers Association Bulletin No. 9-73 was utilized, except that commercially available rubber shoe heels were used in place of the recommended 2" (5.08 cm) rubber cubes. A black heel mark is an actual deposition of rubber onto or into the coating, whereas a scuff mark results from physical displacement of the coating which appears as an area of reduced gloss. Scuff and black heel marks can occur independently or simultaneously at the point where the heel impacts the substrate; i.e., upon removal of a black heel mark, a scuff may be present.

Soil Resistance: The method for determining soil resistance is described in the "Annual Book of ASTM Standards," Section 15 Volume 15.04, Test Procedure ASTM D3206 (2002). This test method covers the determination of soil resistance of floor polishes on test tiles. A carpet covered roller is used to simulate the action of foot traffic. A synthetic soil is employed in conjunction with the roller.

The floor polish of Example 7 was tested. Also tested was a comparative floor polish, which was a commercially available floor polish, which is believed to include a polymer that includes polymerized units of acrylic, methacrylic, and/or styrene monomers and that has carboxylic functional groups; which is believed to include zinc ions; which is believed to be a composition different from the compositions of the present invention, and which is believed to be made by methods different from the methods of the present invention.

The floor polishes were applied to substrates by the method described herein above, and the results of the tests were as follows:

| Polish Property | Comparative | Example 7 |
| --- | --- | --- |
| Gloss | G-VG | G-VG |
| Recoat Gloss | VG | VG |
| Recoatability | VG | VG |
| Film Formation | EXC | EXC |
| Scuff Resistance | Good | G-VG |
| Black Mark Resistance | P-F | VG-EXC |
| Soil Resistance | Fair | Good |

The rating terms in the above table were as follows, in order of increasing desirability:
P = poor;
P-F = poor-fair;
F = fair;
F-G = fair-good;
G = good;
G-VG = good-very good;
VG = very good;
VG-EXC = very good-excellent;
E = excellent.

The floor polish of Example 7 is at least as good as the comparative floor polish in every test, and the floor polish of Example 7 is better than the comparative floor polish at Scuff Resistance, Black Mark Resistance, and Soil Resistance.

We claim:

1. A process of forming a composition, comprising the steps of
   (a) forming at least one aqueous polymer dispersion by a process comprising polymerization of a monomer mix comprising 5-50% by weight based on the weight of said monomer mix, of one or more carboxylic acid functional monomers;
   (b) forming a preliminary admixture by admixing said dispersion (a) with 1 to 5 parts by weight of at least one swelling agent, based on 100 parts by weight of said monomer mix, wherein said preliminary mixture contains no polyvalent metal cation or said preliminary mixture contains polyvalent metal cation in an amount such that the ratio of equivalents of polyvalent metal ions in said preliminary admixture to equivalents of carboxylic acid functional groups in said preliminary admixture is 0.25 or less to 1; and
   (c) forming a subsequent admixture by admixing said preliminary admixture (b) with at least one polyvalent metal ion, wherein the ratio of equivalents of polyvalent metal ions in said subsequent admixture to equivalents of carboxylic acid functional groups in said subsequent admixture is 0.4 or more to 1;
   further comprising the step of admixing one or more cosurfactant with said dispersion (a) after the formation of said dispersion (a) and before said admixing of said dispersion (a) with said swelling agent, wherein said cosurfactant is a nonionic surfactant and wherein said nonionic surfactant is an ethoxylate.

2. The process of claim 1, wherein the amount of said swelling agent that is admixed with said dispersion (a) in said step (b) is 2 to 5 parts by weight, based on 100 parts by weight of said monomer mix.

3. The process of claim 1, wherein the amount of said swelling agent that is admixed with said dispersion (a) in said step (b) is 4 to 5 parts by weight, based on 100 parts by weight of said monomer mix.

4. The process of claim 1, wherein the ratio of the solid weight of said cosurfactant to the weight of said swelling agent is 0.05 to 1.

5. A process of forming a composition, comprising the steps of
   (a) forming at least one aqueous polymer dispersion by a process comprising polymerization of a monomer mix comprising 5-50% by weight based on the weight of said monomer mix, of one or more carboxylic acid functional monomers;
   (b) forming a preliminary admixture by admixing said dispersion (a) with 1 to 5 parts by weight of at least one swelling agent, based on 100 parts by weight of said monomer mix, wherein said preliminary mixture contains no polyvalent metal cation or said preliminary mixture contains polyvalent metal cation in an amount such that the ratio of equivalents of polyvalent metal ions in said preliminary admixture to equivalents of carboxylic acid functional groups in said preliminary admixture is 0.25 or less to 1; and
   (c) forming a subsequent admixture by admixing said preliminary admixture (b) with at least one polyvalent metal ion, wherein the ratio of equivalents of polyvalent metal ions in said subsequent admixture to equivalents of carboxylic acid functional groups in said subsequent admixture is 0.4 or more to 1 further comprising the step of admixing one or more cosurfactant with said swelling agent before said admixing of said dispersion (a) with said swelling agent, wherein said cosurfactant is a nonionic surfactant and wherein said nonionic surfactant is an ethoxylate.

6. The process of claim 5, wherein the ratio of the solid weight of said cosurfactant to the solid weight of swelling agent is 0.05 to 1.

* * * * *